United States Patent [19]
Lubowitz

[11] Patent Number: 5,356,009
[45] Date of Patent: Oct. 18, 1994

[54] CUSHIONED OVERPACK FOR CONTAINING HAZARDOUS SUBSTANCES

[75] Inventor: Hyman R. Lubowitz, Rolling Hills, Calif.

[73] Assignee: Environmental Protection Polymers, Inc., Rolling Hills Estates, Calif.

[21] Appl. No.: 929,890

[22] Filed: Aug. 11, 1992

Related U.S. Application Data

[63] Continuation-in-part of Ser. No. 58,402, Jun. 8, 1987, Pat. No. 5,137,166.

[51] Int. Cl.⁵ .................. B65D 90/04; B65D 43/14; B65D 81/00
[52] U.S. Cl. .................. 206/524; 206/524.3; 206/524.4; 220/444; 220/613
[58] Field of Search .............. 264/274, 45.1; 206/523, 206/524, 524.1, 524.3, 524.6, 524.4, 524.5; 220/902, 444, 415, 613, DIG. 14, 625, 626, 627; 156/77, 78, 79

[56] References Cited

U.S. PATENT DOCUMENTS

| | | | |
|---|---|---|---|
| 3,223,232 | 12/1965 | Coen | 206/524 |
| 3,970,324 | 7/1976 | Howat | 264/274 X |
| 4,060,581 | 11/1977 | Darby et al. | 264/274 X |
| 4,267,927 | 5/1981 | English, Jr. | 206/524 |
| 4,560,069 | 12/1985 | Simon | 206/523 X |
| 4,588,088 | 5/1986 | Allen | 206/524 X |
| 4,709,833 | 12/1987 | Granberg et al. | 220/659 X |
| 4,851,821 | 7/1989 | Howard et al. | 220/455 X |
| 5,137,166 | 8/1992 | Unger et al. | 206/524.5 X |

Primary Examiner—Jacob K. Ackun, Jr.
Attorney, Agent, or Firm—Timothy T. Tyson

[57] ABSTRACT

Cushioned overpacks are employed for containing, transporting, and storing discarded electrical transformers contaminated by toxic materials such as polychlorinated biphenyls (PCB's). Other articles may be similarly contained, transported, and stored using such cushioned overpacks. The discarded transformers are then consigned to such overpacks together with one or more cushions. The cushions serve to prevent puncturing of the overpack by the transformers during transport and storage. Preferred cushions have a foam composition and are inserted into the overpack by means of a pour-in-place process. Preferred overpacks include an inner surface which is roughened so as to adhere to the inserted cushion. After the insertion of the transformer and cushion is complete the assembly is hermetically sealed by a spin welded closure onto the receptacle. Uncushioned overpacks are fabricated at or near the process site by rotational molding. As such, they may also be employed for securing medical waste for subsequent incineration and for stabilization of contaminated soil.

2 Claims, 2 Drawing Sheets

CUSHIONED OVERPACK FOR CONTAINING HAZARDOUS SUBSTANCES

This is a continuation-in-part of co-pending application Ser. No. 07/058,402 filed on Jun. 8, 1987 corresponding to U.S. Pat. No. 5,137,166 (Aug. 11, 1992), which is incorporated herein by reference.

BACKGROUND

The invention relates to packaging assemblies for containing, transporting, and storing hazardous substances. More particularly, the invention relates to packaging assemblies that employ rotationally molded overpacks hermetically sealed by spin welding and which employ pour-in-place foam to secure the hazardous substance within the overpack.

Rotationally molded overpacks for enclosing 55 gallon drums and a spin welding apparatus employable for hermetically sealing same are disclosed by Samuel Unger et al. (U.S. Pat. No. 4,784,709), incorporated herein by reference. Unger et al. disclose that a 60 gallon overpack formed by a low precision rotational molding technique using thermoplastic resin can be employed to hermetically seal a 55 gallon drum with a high performance closure by a spin welding process using a special spin welding apparatus. In particular, the spin welding apparatus disclosed by Unger et al. is capable of absorbing high vibrational loads while spin welding a large imprecisely molded overpack. The resultant spin weld is seamless and has a high performance. A properly configured spin weld may have a strength which is equal to or in excess of the strength of unmodified portions of the wall of the overpack. Accordingly, 55 gallon drums holding toxic material may be safely transported and securely stored in such spin welded overpacks for long periods of time.

Since commercial rotational molding facilities are more widely available as compared to precision injection molding facilities and since the rotational molding technique is more easily and cheaply implemented as compared to the precision injection molding technique, rotationally molded overpacks may often be fabricated more cost effectively at facilities near clean-up sites having leaky and/or potentially leaky 55 gallon drums. If a mobile spin welding apparatus as described by Unger et al. is brought to a clean-up site, leaky 55 gallon drums at the clean-up site may be hermetically sealed in situ within locally produced rotationally molded overpacks with high performance spin welds. Such use of local facilities and resources reduces transportation costs and enhances the cost effectiveness of the operation.

A number of other articles may be similarly sealed within such spin welded overpacks and transported to a disposal site. However, it is disclosed herein that, if a spin welded overpack is employed to stabilize a heavy article, especially one having a sharp projecting element, such an overpack may be susceptible to being punctured during a drop test that qualifies the assembly for safe transportation. Electrical transformers containing high levels of toxic materials such as polychlorinated biphenyls (PCB's) require safe containerization. Often such transformers include projecting elements. A transformer with projecting elements provides one example of an article which could be sealed within a spin welded overpack but which also has a capability of puncturing the same overpack in which it is contained. Accordingly, the employment of an unmodified spin welded overpack for securing disposal of a transformer that may leak PCB's is sometimes not recommended due to the risk of puncture and the release of such PCB's into the environment. What was needed was a modified overpack which could be employed for handling the disposal of articles such as transformers which often are capable of puncturing unmodified forms of the overpack.

SUMMARY

The invention is a cushioned overpack for containing hazardous substances and methods for making same. Such cushioned overpacks are particularly useful for transporting and storing articles which contain hazardous substances or other substances requiring containment and which often include a sharp projecting element capable of puncturing the overpack during a drop test. In a preferred embodiment, the overpack is fabricated from thermoplastic resin by a rotational molding process and is hermetically sealed by means of a spin welding process. Preferred thermoplastic resins are exemplified by polyethylene, especially the high impact resin; polypropylene; polyamide; polyester; etc. However, before the overpack is sealed, the article containing the hazardous substance is inserted therein and cushioning is provided. In a preferred mode, the cushioning is provided by means of a pour-in-place process using a formulation for making polyurethane foam. The chemical formulation for stabilizing the article by polyurethane foam may be inserted into the overpack by means of a wand. The formulation then undergoes a foaming process which substantially fills the overpack and achieves intimate contact with the article therein. The preferred foam has a polyurethane composition and a stiff resilient consistency with a high modulus of compression and resiliency. The overpack may also include a roughened inner surface which achieves intimate contact with the foam cushioning and tends to prevent its slippage. If the roughened surface is formed with fillers having chemically functional groups such as hydroxyl, amino, carboxyl, etc. which may stem from organic and glass fillers, the polyurethane foam may be chemically as well as mechanically bonded to such roughened surface during the pour-in-place procedure, thereby advancing the mechanical integrity of the assembly.

BRIEF DESCRIPTION OF THE DRAWINGS

FIG.'S 1-8 illustrate a preferred mode of making the cushioned overpack for containing hazardous substances.

DETAILED DESCRIPTION

Disposal Assembly for Electrical Transformer Containing PCB

A preferred mode for making an assembly (2) for containing a leaky electrical transformer (4) having polychlorinated biphenyls (PCB) is illustrated in FIG.'S 1-8.

Figure 1:
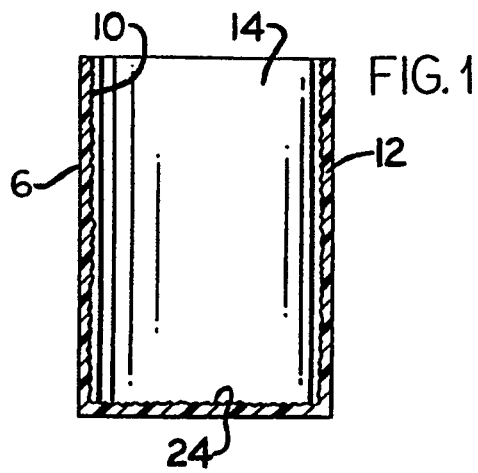
FIG. 1 is a sectional view of an empty receptacle illustrating the roughened inner surface of such receptacle.

FIG. 1 illustrates a preferred embodiment of the receptacle (6) portion of an overpack (8). The receptacle (6) illustrated in FIG. 1 has a roughened inner surface (10). However, receptacles (6) having smooth inner surfaces may also be employed. Preferred methods for making rotationally molded overpacks (8) having a smooth or unroughened inner surface are indicated by Unger et al., U.S. Pat. Nos. 4,784,709 and 5,137,166. The overpack (8) includes a rotationally molded wall (12) with a composition of thermoplastic resin. A simple modification of the rotational molding procedure yields a receptacle (6) having a roughened inner surface (10). After the rotational molding procedure is substantially complete but before the mold is cooled, fillers are entered into the mold. The rotational process is continued and the fillers become attached to the heated resin and distributed over the inner surface (10) of the overpack (8). Preferred fillers include organic fillers such as shell fibers and chopped polyester and nylon. A list of organic fillers is provided by "Organic Fillers," Benjamin M. Walker, pages 420–426 in the *Handbook of Fillers for Plastics*, ed. by Harry Katz and John Milewski (Van Nostrand Reinhold Co., N.Y. 1987), incorporated herein by reference. Additional preferred fillers include various mineral fillers such as chopped glass, natural silica, calcium carbonate, etc. A list of mineral fillers is provided by "Mineral Fillers Section III," pages 117–232 in the *Handbook of Fillers for Plastics*. Preferred fillers are asymmetric and include surface chemically functional groups such as hydroxyl, amino, carboxyl, etc. After the added fillers are well distributed, the rotational mold may then be cooled and the product demolded. The fillers tend to become wetted by the thermal plastic and to remain at or near the inner surface (10). The presence of such fillers imparts a roughened texture to the inner surface (10) of the receptacle (6).

Figure 3:
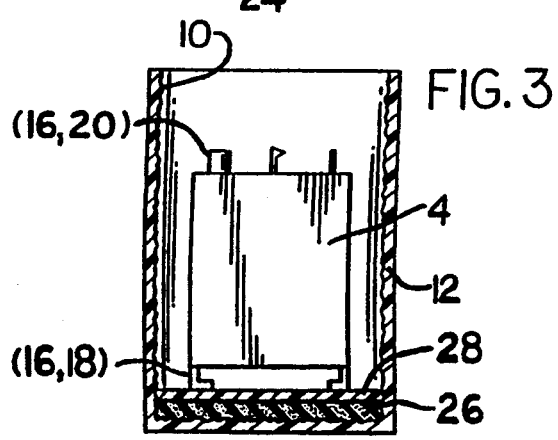
FIG. 3 is a sectional view of the partial assembly of FIG. 2 illustrating the insertion of a discarded electrical transformer atop the rigid member within such receptacle.

The receptacle (6) defines a chamber (14) for containing the transformer (4) or other articles. FIG. 3 illustrates a transformer (4) having several projecting elements (16), e.g. the legs (18) and the insulators (20). Such projecting elements (16) are of a type which, if left unrestrained or unstabilized within an uncushioned overpack, could possibly cause a puncture therein during a drop test or during transport and storage. Although FIG. 3 illustrates only an electrical transformer (4), a wide variety of other articles may be similarly incorporated into such assemblies (2). For example, 55 gallon drums having projecting chimes are suitable articles for incorporation into such assembly. If left unstabilized within an overpack, the chime which projects from the bottom or top of a 55 gallon drum is one type of projecting element (16) which is capable of causing a puncture within an overpack (8) during a drop test. Regardless of the particular article incorporated into an assembly, a wide range of different substances requiring containment, transport, and/or storage, other than PCB, may be contained within the articles incorporated into such assemblies (2).

Figure 2:
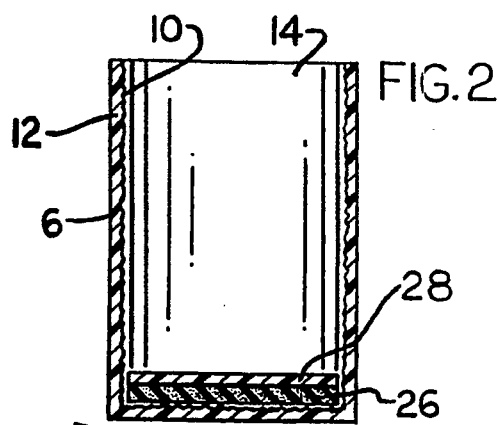
FIG. 2 is a sectional view of a partial assembly illustrating the receptacle of FIG. 1 and the insertion of a first foam slab onto the bottom of such receptacle and a rigid member atop such foam slab.
Figure 4:
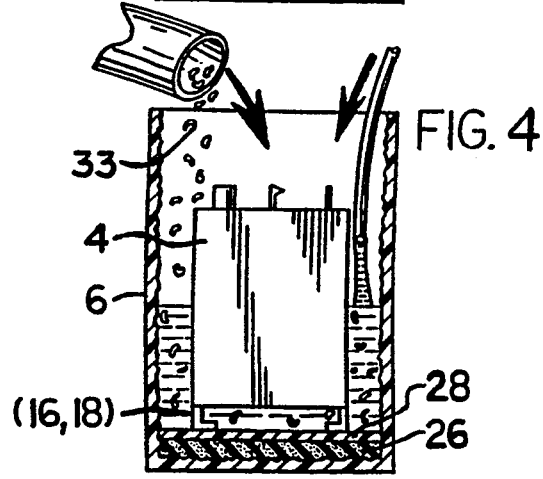
FIG. 4 is a sectional view of the partial assembly of FIG. 3 illustrating a pour-in-place process for loading the receptacle with a liquid formulation for making polyurethane foam and filler material. The liquid foam preparation is directed into the receptacle by means of a wand.

Prior to the insertion of the electrical transformer (4) into the receptacle (6), a cushion may be placed on the bottom (24) of the receptacle (6). FIG. 2 illustrates the placement of a circular foam slab (26) on the bottom (24) of the receptacle (6). Alternatively, a pour-in-place slab may be fabricated within the receptacle (6). The circular foam slab (26) serves as a cushion. In the preferred mode, the foam slab (26) has a stiff resilient consistency and a high modulus of compression and resilience. However, the cushion may have compositions other than that of a foam slab (26). Furthermore, the foam slab (26) may have a consistency which is other than stiff. A rigid support (28) may overlay the cushion, e.g. the circular foam slab (26). In the preferred mode, the rigid support (28) is circular and has sufficient strength to support the transformer (4). The rigid support (28) distributes the weight of the transformer (4) over the entire cushion and prevents the legs (18) of the transformer (4) from penetrating the cushion. A pour-in-place process for securing the position of a transformer (4) within the chamber (14) of the receptacle (6) is illustrated in FIG. 4. During the pour-in-place process, a low-viscosity liquid formulation (30) is inserted into the receptacle (6). The liquid formulation (30) may be directed into the receptacle (6) by means of a wand (32). The liquid formulation (30) may include a blowing agent, catalysts, and reactants for making foam. A preferred foam is polyurethane. However, other foams are also employable, e.g. polyisocyanurate, polystyrene, polyolefin, polyvinyl chloride, epoxy, ureaformaldehyde, latex, silicone, fluoropolymer, various syntactic polymer foams, etc. Formulations and protocols for making such foams are provided by Daniel Klempner and Kurt C. Frisch, the *Handbook of Polymeric Foams and Foam Technology*, (Hanser, Munich 1991), incorporated herein by reference.

To reduce the cost of pour-in-place foams (34), various fillers (33) may be admixed. FIG. 4 illustrates the admixture of polystyrene "peanuts" (33) with a polyurethane pour-in-place foam (34). The preferred foams are stiff but resilient and have a high modulus of compression and resilience.

Pour-in-place foams have the advantage that they achieve intimate contact with both the enclosed transformer (4) and with the inner wall (12) of the receptacle (6). Additionally, the pour-in-place (34), in combination with the various inserted foam slabs (26, 38), can fill substantially all unoccupied areas within the receptacle (6). The combination of the intimate contact between the foam and the transformer (4) and the space filling property of pour-in-place foam (34) effectively stabilizes the transformer (4) within the overpack (8) and prevents the projecting elements (16) from puncturing the wall (12) of the overpack (8), including the lid (40) and bottom (24). If the inner surface (10) of the wall (12) of the overpack (8) is roughened, the contact between the pour-in-place foam (34) and the receptacle (6) is further enhanced. And finally, if the inner surface (10) of the wall (12) of the overpack (8) is roughened with fillers which have surface chemically functional groups, a chemical bond may form between such fillers and the polyurethane foam so as to further enhance the adhesion between these the foam and the inner wall.

The stabilization of the transformer within the receptacle may be further enhanced, prior to the pour-in-place process by encircling the transformer with a cylindrical support, such as glass fabric scroll, layered against the inner wall. The cylindrical support rests on the bottom rigid support (28) and extends to a position above the top-most-portion of the transformer. The cylindrical support should encircle or substantially encircle the transformer. The cylindrical support is particularly useful in conjunction with the use of a second rigid element (36) positioned above the transformer.

Figure 5:
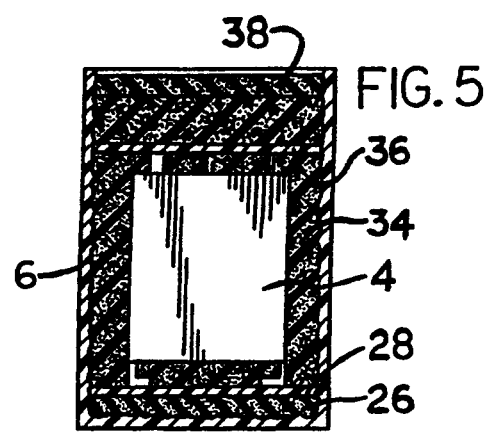
FIG. 5 is a sectional view of the partial assembly of FIG. 4 illustrating the transformation of the pour-in-place liquid formulation foam from a liquid state to a foam-in-place state. The resultant foam cushion envelopes the transformer. Insertion of a second rigid member above the transformer and of a second foam slab are also illustrated.

After cylindrical support has been inserted into the receptacle and the pour-in-place process has covered the top of the transformer (4), a second rigid element (36) may be positioned above the transformer (4) as illustrated in FIG. 5. The added combination of more pour-in-place foam (34) and/or a second foam slab (38) may be inserted into the receptacle (6) over such rigid element (36) as illustrated in FIG. 5. The resultant cushion should nearly fill the receptacle (6) but should not extend all the way to the top, since this would interfere with the subsequent spin weld closure of the receptacle (6).

Figure 6:
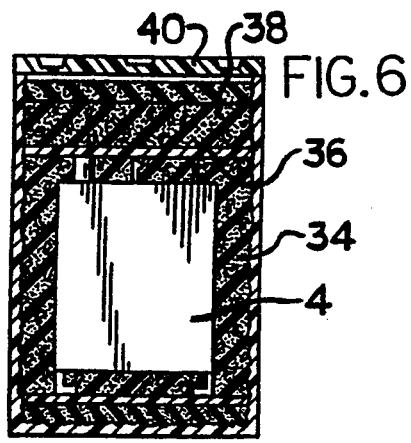
FIG. 6 is a sectional view of the partial assembly of FIG. 5 illustrating the placement of a lid atop the opening of the loaded receptacle.
Figure 7:
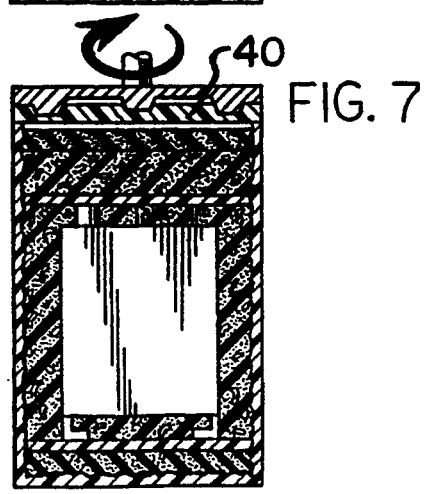
FIG. 7 is a sectional view of the partial assembly of FIG. 6 illustrating the spin welding of the lid onto the opening of the loaded receptacle.
Figure 8:
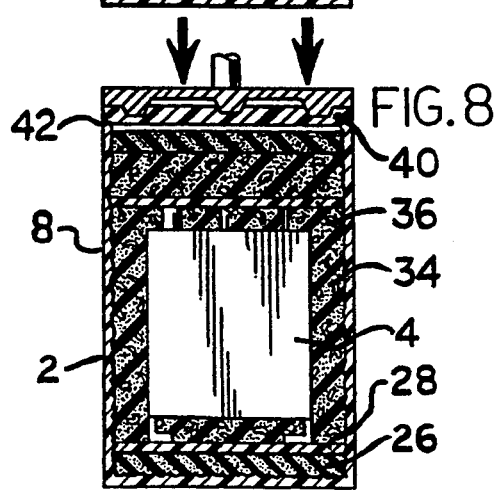
FIG. 8 is a sectional view illustrating the curing of the spin welded lid onto the opening of the receptacle and of the completion of the cushioned overpack of FIG. 7.
Figure 9:
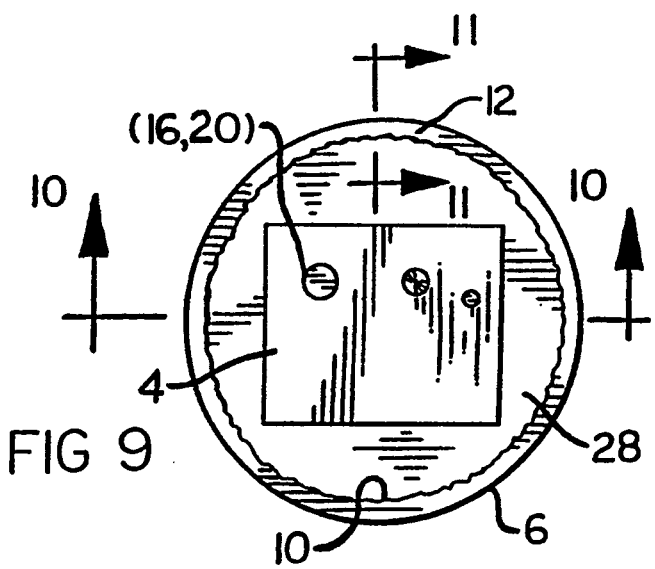
FIG. 9 is a plan view of a partial assembly illustrating the top of an alternative transformer and the interior of an alternative receptacle, both of which are similar to the partial assembly of FIG. 3, except slightly larger.
Figure 10:
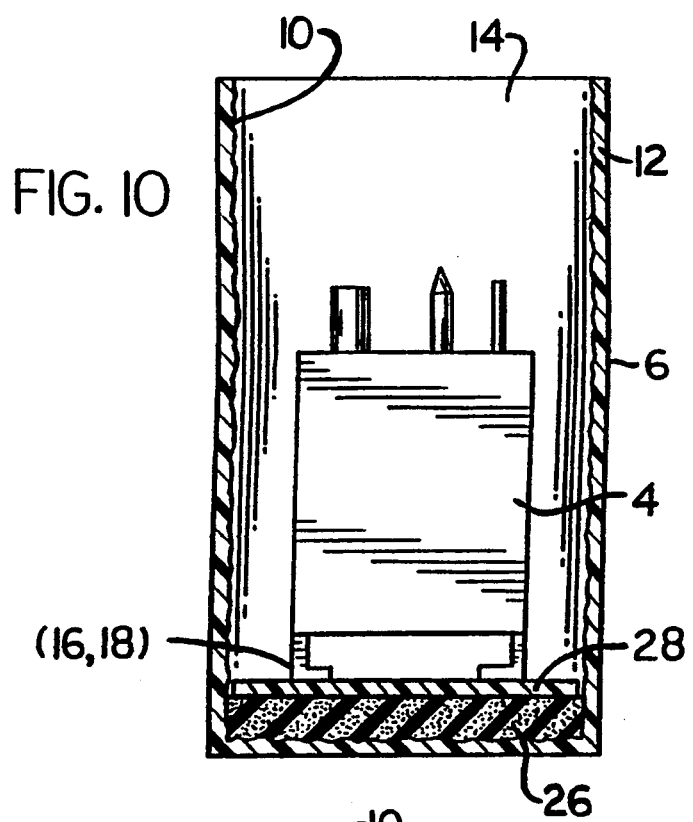
FIG. 10 is a sectional side view of the partial assembly of FIG. 9 illustrating a side view of the alternative transformer.
Figure 11:
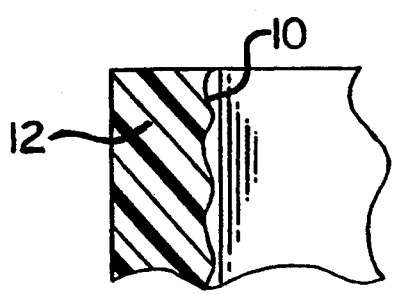
FIG. 11 is an enlarged sectional view of the wall of the partial assembly of FIG. 9 illustrating a roughened inner surface.

After the positioning of the cushioning within the receptacle (6) is complete, the overpack (8) may be sealed by means of a spin welding process. During the spin welding process, a lid (40) is positioned over the opening of the receptacle (6) as illustrated in FIG. 6 and is then spin welded thereto, as illustrated in FIG. 7. FIG. 8 illustrates the curing of the spin welded closure under pressure. The spin welding and curing processes create a high performance closure (42) which hermetically seals the transformer (4) within the overpack (8).

The cushioning within the overpack (8) need not only be formed by means of a pour-in-place process. Cushions make with slab foam and other forms of lagging may also be employed to secure the position of the transformer (4) within the overpack (8). Such cushions restrain or stabilize the transformer (4) within the overpack (8) and prevent its puncture. Properly positioned cushions can prevent the projecting elements (16) of the transformer (4) from puncturing the rotationally molded wall (12) of the overpack (8) during transport and storage. Accordingly, such cushions can preserve the hermetic closure (42) of the overpack (8) and prevent the escape of PCB's therefrom.

Assemblies for Safeguarding Substances and Articles Against Tampering during Shipping There are a number of circumstances in the pharmaceutical field, the aviation field, and other fields in which substances or articles need to be safeguarded against tampering during the shipping process. In such instances, the chief concern is not that the substance or article is hazardous or precious, which it may be, but rather that unapparent alteration or substitution of the substance or article not occur during shipping. In the pharmaceutical area, alteration or substitution of a drug or medicinal during shipping may pose a health hazard. In the aviation area, alteration or substitution of an airplane part may pose a hazard. In each case, such alteration or substitution may be motivated by malice or greed. If apparent tampering of the container occurs during shipping, the substances or articles contained therein may be viewed with doubt regarding their authenticity. However, if the shipping container has a design which allows unapparent tampering, the receiver may lack assurance that the substance or article received is genuine. The cushioned overpack (8) may be employed as a shipping container for transmitting substances and articles with a high level of assurance that no unapparent tampering has occurred. In the preferred embodiment, the cushioned overpack (8) is rotationally molded with thermoplastic resin and includes a spin welded closure (42) for hermetically sealing the article within the chamber (14). Additionally, the preferred cushion has a foam composition formed within the chamber (14) of the overpack (8) by means of a pour-in-place process. The foam composition substantially fills the overpack (8) and envelops the articles achieving an intimate contact therewith. In such instance, assurance concerning tampering of the articles may be achieved by examining the rotationally molded wall (12) and the spin weld of the overpack (8) and by examining the intimate contact between the foam composition of the cushion and the article.

Assemblies with Layered Articles Enveloped by Layered Pour-in-Place Foam

In many instances, it is desirable to make a cushioned overpack (8) containing several articles, each article or set of articles being layered into the overpack (8) and enveloped by separate layered cushions made from pour-in-place foam. In such instances, there can be a significant time lapse between the deposition of the different layers of pour-in-place foam. After the last layered cushion is deposited into the overpack (8), the overpack (8) may be sealed by means of the spin welding apparatus for hermetically sealing the layered articles within the chamber (14).

Use of an Overpack for Incinerating Medical Waste with Reduced Incombustible Residue The overpack (8) may be employed for conveying and incinerating hazardous medical waste without including metallic packaging components within the incineration process. The spin welded overpack (8) provides a low cost, high performance means for disposing of medical waste. However, unlike other high performance containers, the spin welded overpack (8) does not employ metallic packaging components to effect a hermetic closure (42). Accordingly, if medical waste is sealed within an overpack (8) by means of a spin welding process and is then transported to an incineration site for incineration, the resultant ash does not include the metallic packaging components which would otherwise have been required to effect a high performance closure (42). Accordingly, the use of such spin welded overpacks (8) for packaging, transporting, and disposal of the hazardous medical waste enhances the safety and economy of such disposal operation. Additionally, employment of an overpack (8) without the inclusion of metallic packaging components reduces the incombustible residue found in the resultant ash after incineration.

Use of an Overpack for Disposal of Contaminated Soil

Spin welded overpacks (8) may be employed as a high performance cost effective method for containing and disposing of contaminated soil. In a preferred mode, the contaminated soil may be simply loaded directly into the overpack (8) and hermetically sealed by means of the spin welding process. The contaminated soil in the welded overpack (8) may then be transported to a disposal site. In an alternative preferred mode, the contaminated soil is admixed with self hardening substances such as thermosetting resin, hydraulic cement, or inorganic binders as it is loaded into the receptacle (6). Admixture of the contaminated soil and the self hardening substances may be achieved by simultaneously spraying both components into the overpack (8), as well as admixing it and casting it in the receptacle (6). Addition of the self hardening substances enhances the containment of the soil within the overpack (8). Addressing a contaminated soil area, remedification of the soil may be carried out by sealing such soil in spin welded overpacks. The overpacks are then interred into the ground with the interstitial space between the overpacks being filled by uncontaminated soil or by concrete. The use of concrete within the interstitial space further serves to stabilize the assembled overpacks to overburden.

What is claimed is:

1. A packaging assembly for containing a hazardous article, comprising:

an overpack defining a chamber for containing said article, said overpack having a rotationally molded wall with a composition of thermoplastic resin;

a filler carried by the inner surface of said wall, said filler including a chemically functional group selected from hydroxyl, amino and carboxyl;

a foam cushion positioned within said chamber, said cushion formed by a pour-in-place process which chemically bonds said cushion to said filler and said cushion having an outer shape conforming to the shape of said chamber; and a closure formed of thermoplastic resin and spin welded to said wall of said overpack for hermetic sealing thereof.

2. The packaging assembly as described in claim 1 wherein said foam cushion comprises polyurethane.

* * * * *